United States Patent Office 2,734,902
Patented Feb. 14, 1956

2,734,902

STABLE AQUEOUS SOLUTION OF VITAMIN $B_1$ AND METHOD FOR PREPARING THE SAME

Leendert Marinus Kuijvenhoven and Cornelis Westerterp, Olst, Netherlands, assignors to Hartford National Bank and Trust Company, Hartford, Conn., as trustee No Drawing. Application February 17, 1953, Serial No. 337,426

Claims priority, application Netherlands Apr. 29, 1952

8 Claims. (Cl. 260—256.6)

This invention relates to stable aqueous solutions of vitamin $B_1$ and other vitamins of the B-complex and to a method of preparing the same.

Clear aqueous solutions of vitamin $B_1$ or other solutions containing not only this vitamin but also others of the vitamin B-complex, e. g. $B_2$, are not stable, that is, a voluminous deposit is produced after some time, for example, a few months. This is considered to be a disadvantage, the more so, if the liquids concerned are intended for therapeutic or prophylactic purposes.

It is a main object of this invention to provide stable aqueous solutions of vitamin $B_1$ and particularly to solutions containing vitamin $B_1$ and other vitamins of the B-complex.

It is a further object of this invention to provide a simple and expeditious method for producing really stable solutions of vitamin $B_1$ and other vitamins of the B-complex.

In accordance with the inventon aqueous solution containing vitamin $B_1$, a stabilizing agent selected from the group consisting of thioglycolic acid, thio-malic acid, methonine, thiourea, thiophen-carbonic acid, thio-dibutyric acid, allyl-thiourea, glycocol and asparagine is added to an aqueous solution containing vitamin $B_1$ in a quantity sufficient to avoid or delay the production of a deposit in the solution.

While all of the afore-mentioned stabilizing agents are quite satisfactory thioglycolic acid, thio-malic acid and methionine are preferred. The stabilizing agents are preferably added in concentrations of between 0.05 and 5% by weight/volume to the aqueous solutions containing vitamin $B_1$.

It is also advisable to choose the pH of the final solutions to be such that its value lies between 2 and 7 in order to prevent the vitamin from decomposing in the solution or from becoming insoluble. For producing a solution containing no other vitamin than vitamin $B_1$ a pH-value lying between 2 and 3.5 is suitable; this value is particularly suitable to avoid a decrease in the vitamin $B_1$-content. For the production of a solution containing not only vitamain $B_1$, but also other vitamins of the B-complex, such as, inter alia vitamin $B_2$, the pH-value should be adjusted preferably to be between 3 and 5. Moreover, in the latter case it is advisable to use distilled water containing a minimum of ions of heavy metals and to protect the solution as much as possible from light, in order to prevent the vitamin $B_2$ from becoming inactive. The fact that the stabilizing agents retard or delay the formation of a deposit may be determined by comparing the solutions with the stabilizing agents to which no stabilizers are added. It should be noted that the results of such a comparison test may be affected by the fact that the formation of a deposit may be delayed by oversaturation.

The invention will now be explained with reference to the following examples. In the following experiments distilled water, which was freed as much as possible from ions of heavy metals, was used. The production of the B-complex solutions, i. e. both of the comparison solutions and of the solutions to which a stabilizing agent was added, was carried out with the solutions protected as much as possible from light.

Ampullae were filled with the produced solutions under aseptic conditions; then the ampullae were sealed by melting and stored at 37° C. Only in the case of Example I was sterilization carried out for one hour at 100° C.

Example I

Ampullae, filled with part of a solution (pH=3) of 125 gr. of hydrochloric salt of vitamin $B_1$ in 2½ litres of water to which 5 gr. of thioglycolic acid had been added, did not contain a deposit after a storage for 8 months at 37° C., whereas ampullae filled with a comparison solution already contained a deposit after 4 months.

Example II

A clear vitamin B-complex solution was produced from 20 gr. of hydrochloric salt of vitamin $B_1$, 1½ gr. of vitamin $B_2$, 40 gr. of nicotinic acid amide, 40 gr. of hydrochloric salt of vitamin $B_6$, 4 gr. of panthenol, 20 gr. of the hydrochloric salt of procaine and 20 gr. of benzylalcohol in 1 litre of water. 2 gr. of thio-malic acid was added to the solution and the pH value was adjusted to 4.5. Ampullae filled with this solution did not contain a deposit after six months. However, ampullae filled with a comparison solution already contained a deposit after three months.

Example III

A clear vitamin B-complex solution was produced from 20 gr. of hydrochloric salt of vitamin $B_1$, 2 gr. of vitamin $B_2$, 50 gr. of nicotinic acid amide, 2 gr. of hydrochloric salt of vitamin $B_6$, 4 gr. of panthenol, 20 gr. of hydrochloric salt of procaine and 20 gr. of benzylalcohol in 1 litre of water to which was added 1 gr. of thioglycolic acid. Then the pH was adjusted to 4.5. Ampullae filled with this solution did not contain a deposit after six months. The comparison solution, on the contrary, already contained a deposit after three months. Similar results were obtained by adding 0.5 gr., 2 gr., 3 gr. and 5 gr. of thioglycolic acid to the aforesaid vitamin B-complex solution. It also was found that the addition of only 0.2 gr. of thioglycolic acid substantially did not have a delaying effect on the formation of a deposit.

Example IV

If instead of thioglycolic acid 1 gr. of methionine was added to a vitamin B-complex solution of the aforesaid composition, the ampullae likewise did not show a deposit after six months.

Example V

To 1 litre of a clear vitamin B-complex solution of a composition indicated under Example III was added 1 gr. of thiourea. Ampullae filled with this solution did not contain a deposit until 4 months later, whereas ampullae filled with a comparison solution already contained a deposit after 3 months.

Similar results as those obtained under Example V were obtained, if to the aforesaid vitamin B-complex solution was added, instead of thiourea, thiophencarbonic acid, thiodibutyric acid, allylthiourea, glycocoll or asparagine.

The method according to the invention is particularly suitable for the production of therapeutic or prophylactic liquids containing vitamin $B_1$, for oral or intermuscular use.

While the invention has been described in connection with specific examples and applications, other modifications thereof will be readily apparent to those skilled in the art without departing from the spirit and scope of the invention as defined in the appended claims.

What is claimed is:

1. A method of preparing stable aqueous solutions containing vitamin $B_1$ comprising the steps, adding to the solution containing vitamin $B_1$ about 0.05 to 5% by weight/volume of a thio-carboxylic acid selected from the group consisting of thioglycolic acid, thiomalic acid and thio-dibutyric acid to retard the formation of a deposit, and adjusting the pH of the solution to between about 2 and 7.

2. A method of producing an aqueous vitamin solution containing only vitamin $B_1$, as claimed in claim 1, in which the pH-value of the solution is adjusted between 2 and 3.5.

3. A method of producing an aqueous solution containing vitamin $B_1$ as claimed in claim 1 in which the solution also contains other vitamins of the B-complex and the pH is adjusted between 3 and 5.

4. A method as claimed in claim 3, in which the solvent is substantially free of ions of heavy metals.

5. A stable aqueous solution of vitamin $B_1$ containing about 0.05 to 5% by weight/volume of a thiocarboxylic acid selected from the group consisting of thioglycolic acid, thiomalic acid and thio-dibutyric acid and having a pH of about 2 to 7.

6. An aqueous solution of vitamin $B_1$ as claimed in claim 5 containing only vitamin $B_1$ and having a pH value between 2 and 3.5.

7. A stable aqueous solution of vitamins of the B-complex including at least vitamin $B_1$ and containing about 0.05 to 5% by weight/volume of a thiocarboxylic acid selected from the group consisting of thioglycolic acid, thiomalic acid, and thio-dibutyric acid, said solution having a pH of about 2 to 7.

8. An aqueous solution of vitamins of the B-complex as claimed in claim 7 which is substantially free of ions of heavy metals.

References Cited in the file of this patent

Howard: Modern Drug Encyclopedia and Therapeutic Index (5th ed.), pp. 56–57.